US011934993B2

(12) United States Patent
Agasti et al.

(10) Patent No.: US 11,934,993 B2
(45) Date of Patent: *Mar. 19, 2024

(54) ORDER FULFILLMENT SYSTEMS AND METHODS WITH CUSTOMER LOCATION TRACKING

(71) Applicant: TRANSFORM SR BRANDS LLC, Hoffman Estates, IL (US)

(72) Inventors: Varun Reddy Agasti, Schaumburg, IL (US); Leena Munjal, Algonquin, IL (US)

(73) Assignee: TRANSFORM SR BRANDS LLC, Hoffman Estates, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/113,540

(22) Filed: Feb. 23, 2023

(65) Prior Publication Data
US 2023/0196274 A1 Jun. 22, 2023

Related U.S. Application Data

(63) Continuation of application No. 16/654,573, filed on Oct. 16, 2019, now Pat. No. 11,605,050, which is a
(Continued)

(51) Int. Cl.
G06Q 10/0836 (2023.01)
H04W 4/029 (2018.01)
H04W 4/12 (2009.01)

(52) U.S. Cl.
CPC ........ G06Q 10/0836 (2013.01); H04W 4/029 (2018.02); H04W 4/12 (2013.01)

(58) Field of Classification Search
USPC ....................................... 705/339
See application file for complete search history.

(56) References Cited

U.S. PATENT DOCUMENTS 5,734,971 A   3/1998  Thayer
6,026,375 A   2/2000  Hall et al.
(Continued)

FOREIGN PATENT DOCUMENTS

CA      2831413       10/2012
WO   2004072762       8/2004
(Continued)

OTHER PUBLICATIONS

"Creating Usable Mobile Ambient Intelligent Applications for Hospitality Customers", Galen R Collins, Jul. 31, 2010 Retreived from https://scholarworks.umass.edu/cgi/viewcontent.cgi?referer=scholar.google.com&httpsredir=1&article=1282&context=refereed&sei-redir=1.*

(Continued)

Primary Examiner — Atta Khan
(74) Attorney, Agent, or Firm — McAndrews, Held & Malloy, Ltd.

(57) ABSTRACT

Systems, methods, and apparatus are disclosed that provide a pickup process for items purchased from a store. In some embodiments, a mobile computing device of a customer may determine whether the mobile computing device and therefore the customer are in a pickup zone for a store. In response to determining that the mobile computing device is in the pickup zone, the mobile computing device may notify the customer and request whether the customer wishes to initiate pickup of purchased items from the store. The mobile computing device may notify a merchandise pickup system of the customer's desire to pickup the purchased items.

21 Claims, 5 Drawing Sheets

Related U.S. Application Data continuation of application No. 14/831,218, filed on Aug. 20, 2015, now Pat. No. 10,453,025, which is a continuation of application No. 13/923,695, filed on Jun. 21, 2013, now abandoned.

(56) References Cited

U.S. PATENT DOCUMENTS

| | | | |
|---|---|---|---|
| 6,085,172 | A | 7/2000 | Junger |
| 6,321,211 | B1 | 11/2001 | Dodd |
| 6,536,659 | B1 | 3/2003 | Hauser et al. |
| 6,880,750 | B2 | 4/2005 | Pentel |
| 6,954,735 | B1 | 10/2005 | Djupsjobacka |
| 7,162,440 | B2 | 1/2007 | Koons |
| 7,376,572 | B2 | 5/2008 | Siegel |
| 7,797,164 | B2 | 9/2010 | Junger et al. |
| 7,859,411 | B2 | 12/2010 | Chakraborty |
| 8,104,682 | B2 | 1/2012 | Junger |
| 8,156,007 | B1 | 4/2012 | Anthony et al. |
| 8,200,550 | B2 | 6/2012 | Altkins |
| 8,386,337 | B2 | 2/2013 | Siegel |
| 8,635,113 | B2 | 1/2014 | Borders et al. |
| 8,645,222 | B1 | 2/2014 | Tamassia et al. |
| 9,398,619 | B1 | 7/2016 | Sennett |
| 11,240,630 | B2* | 2/2022 | Parshin |
| 2001/0032062 | A1 | 10/2001 | Plaskoff |
| 2001/0037207 | A1 | 11/2001 | Dejaeger |
| 2002/0010634 | A1 | 1/2002 | Roman |
| 2002/0019785 | A1 | 2/2002 | Whitman |
| 2002/0062260 | A1 | 5/2002 | Inoue |
| 2002/0107715 | A1 | 8/2002 | Pace et al. |
| 2002/0111881 | A1 | 8/2002 | Walker et al. |
| 2002/0143655 | A1 | 10/2002 | Elston et al. |
| 2006/0076397 | A1 | 4/2006 | Langos |
| 2006/0178943 | A1 | 8/2006 | Rollinson et al. |
| 2006/0271684 | A1* | 11/2006 | Booth .......................... 709/227 |
| 2007/0088624 | A1 | 4/2007 | Vaughn et al. |
| 2007/0106468 | A1 | 5/2007 | Eichenbaum et al. |
| 2007/0124216 | A1 | 5/2007 | Lucas |
| 2007/0138268 | A1 | 6/2007 | Tuchman |
| 2007/0257774 | A1 | 11/2007 | Stumpert et al. |
| 2008/0046385 | A1 | 2/2008 | Dube et al. |
| 2008/0228600 | A1 | 9/2008 | Treyz et al. |
| 2009/0187488 | A1 | 7/2009 | Shamilian |
| 2009/0187489 | A1 | 7/2009 | Mallick et al. |
| 2009/0281903 | A1 | 11/2009 | Blatstein |
| 2009/0327047 | A1 | 12/2009 | Sussman |
| 2010/0088148 | A1 | 4/2010 | Presswala et al. |
| 2010/0131420 | A1 | 5/2010 | Williams |
| 2010/0293106 | A1* | 11/2010 | Rhoads ......................... 348/161 |
| 2011/0010261 | A1 | 1/2011 | Inskeep |
| 2011/0055046 | A1 | 3/2011 | Bowen |
| 2011/0112992 | A1 | 5/2011 | Liu et al. |
| 2011/0130129 | A1* | 6/2011 | Snyder ....................... 455/414.1 |
| 2011/0218884 | A1 | 9/2011 | Kothari |
| 2011/0258058 | A1 | 10/2011 | Carroll et al. |
| 2012/0178423 | A1 | 7/2012 | Luo |
| 2012/0289254 | A1* | 11/2012 | Dishneau ................... 455/456.3 |
| 2012/0303273 | A1 | 12/2012 | Su |
| 2013/0030945 | A1 | 1/2013 | Polt |
| 2013/0085889 | A1 | 4/2013 | Fitting et al. |
| 2013/0096966 | A1 | 4/2013 | Barnes, Jr. |
| 2014/0058886 | A1 | 2/2014 | Gopalakrishnan |
| 2014/0064116 | A1 | 3/2014 | Linde et al. |
| 2014/0074743 | A1* | 3/2014 | Rademaker .................. 705/334 |
| 2014/0330740 | A1 | 11/2014 | Hoffmann, Jr. |
| 2015/0054620 | A1 | 2/2015 | Graube et al. |
| 2020/0396227 | A1* | 12/2020 | Fan |

FOREIGN PATENT DOCUMENTS

| | | |
|---|---|---|
| WO | 2006113223 | 10/2006 |
| WO | 2008014255 | 1/2008 |
| WO | 2011005072 | 1/2011 |

OTHER PUBLICATIONS

Int'l Search Report and Written Opinion Appln No. PCT/US2012/069149 dated Feb. 19, 2013.
Mo et al., "RFID Infrastructure for Large Scale Supply Chains Involving Small and Medium Enterprises.", In: Sustainable Radio Frequency Identification Solutions, Bok edited by: Cristina Turcu, ISBN 978-953-7619-74-9, pp. 356, Feb. 2010, INTECh, Croatia, downloaded from sciyo.com.
"More Casual Restaurants trying Curbside Delivery", Horovitz, May 30, 2002, retrieved from http://usatoday30.usatoday.com/money/general/2002/05/31/curbside-dinig.htm.
"Publix Cancels Curbside Pickup", Jan. 22, 2012, retrieved from http://retailtechnologytrends.com/tag/augmented-reality, p. 8.
"Retro Drive-in with Curbside Pickup", Sep. 18, 2012, retrieved from http://blog.munchery.com/2012/09/retro-drive-in-with-curbside-pickup, p. 1.
Int'l Search Report and Written Opinion Appln No. PCT/US2013/023202 dated May 15, 2013.
"Amazon Locker" article, 3 pages.
"Cardrops Is a Service That Puts Stuff You Order Into the Trunk of Your Car. Yeah. Really.", TechCrunch, dated Apr. 27, 2015. (12 pages).
"Cardrops, Your Car Becomes an E-Commerce Delivery Point", dated Apr. 27, 2015. (5 pages).
Gg1, XappSoftware, "How to disable the standby or the sleeping mode while your iPhone application is running ." Mar. 19, 2011 http://web.archive.org/web/20110319005548/http://www.xappsoftware.com/wordpress/2011/03/05/disable-standby-or-sleepingmode-while-running-your-application/.
Gary Ng, "Pizza Pizza iPhone App Brings Ordering Right on your Phone" Apr. 8, 2011 http:/web.archive.org/web/20110726025732/http://www.iphoneincanada.ca/reviews/pizza-pizza-iphone-app-brings-ordering-right-on-your-phone/.
U.S. Appl. No. 14/201,363, filed Mar. 7, 2014.
Int'l Search Report and Written Opinion Appln No. PCT/US2012/058238 dated Jan. 9, 2013.
AppleInsider, "Apple Said to Release iPhone App for In-Store Appointments" (http://forums.appleinsider.com/t/104828/apple-said-to-release-iphone-app-for-in-store-appointments) (Available Nov. 16, 2009), pp. 13.
"2013.11—Retail Tech Miscellany", Mar. 27, 2013, retrieved from http://retailtechnologytrends.com/tag/augmented-reality/, 7 pages.
Holland, Rebecca, "Site-to-store policies help cut down on shipping costs", The Roanoke Times (May 2011), retrieved from http://www.roanoke.com/life/columns_and_blogs/columns/shoptimist/site-to-store-policies-help-cut-down-on-shippping-costs/article_5d0397e6-eB48-51c7-925f-b27c9573b793.html on Jan. 30, 2015, pp. 1.
Ryah, Darron, "Home Depot Now Offers Buy Online, Pick Up or Return In-Store Service", The Apron Blog, retrieved from http://ext.homedepot.com/community/blog/home-dpot-now-offers-buy-online-pick-up-in-store-service/ on Jan. 30, 2015, pp. 2.
Canadian Office Action for CA2853029, dated Sep. 2, 2015 (5 pages).
Collins, G. Roderic Jul. 31, 2019. "Creating Usable Mobile Ambient Intelligent Applications for Hospitality Customers." https://pdfs.semanticscholar.org/7c2d/a215c1a87143fd4edec100709b1e2c2cf0f1.pdf (Year: 2010).
Tracy V. Wilson "How GPS Phones Work", Oct. 24, 2005 HowStuffWorks.com, https://web.archive.org/web/20051124031329/electronics.howstuffworks.com/gps-phone.htm Aug. 3, 2018 (Year: 2005).

* cited by examiner

ORDER FULFILLMENT SYSTEMS AND METHODS WITH CUSTOMER LOCATION TRACKING

CROSS REFERENCE TO RELATED APPLICATIONS AND INCORPORATION BY REFERENCE

This application is a continuation of U.S. application Ser. No. 16/654,573, filed Oct. 16, 2019, which is a continuation of U.S. application Ser. No. 14/831,218, filed Aug. 20, 2015 (U.S. Pat. No. 10,453,025), which is a continuation of U.S. application Ser. No. 13/923,695, filed Jun. 21, 2013. The aforementioned documents are hereby incorporated herein by reference in their entirety.

FIELD OF THE INVENTION

The invention relates to the field of order fulfillment and, more specifically, to services associated with picking-up ordered items.

BACKGROUND

Customers commonly purchase items such as goods and/or services from various brick-and-mortar establishments such as retail stores, grocery stores, consumer electronic boutiques, etc. When purchasing items from such establishments, a customer often selects and places such items in a shopping cart or basket. After placing items in their shopping cart, the customer then proceeds to a checkout lane where a sales associate scans each item into a point of sale terminal in order to determine the total purchase price for the selected items. The sales associate collects payment from the customer and provides the customer with a sales receipt or another form showing proof of purchase for the selected and paid for items. After checking out via one of the provided checkout lanes, the customer is then free to leave the brick-and-mortar establishment with the purchased items.

A similar process is commonly used by customers that purchase items from various on-line establishments. When purchasing items from such establishments, a customer instead of placing items in a physical shopping cart places such items in a virtual shopping cart. After placing items in their virtual shopping cart, the customer may then proceed with checkout which determines the total purchase price for the items selected by the customer, collects payment for the selected items, and arranges for delivery of such items to the customer. Commonly, delivery to the customer takes the form of shipping the items to an address specified by the customer. Moreover, such shipping is commonly at the customer's expense.

The above conventional brick-and-mortar and on-line shopping processes may be effective. However, there is still room for improving such processes to provide unique shopping experiences and strengthen customer loyalty.

BRIEF SUMMARY OF THE INVENTION

Systems and methods directed to an order fulfillment process are substantially shown in and/or described in connection with at least one of the figures, and are set forth more completely in the claims.

These and other advantages, aspects and novel features of the present invention, as well as details of illustrated embodiments thereof, will be more fully understood from the following description and drawings.

DETAILED DESCRIPTION OF THE INVENTION

Some disclosed embodiments are directed to fulfillment of customer orders and, in particular, delivering and/or otherwise providing ordered items such as goods and/or services to a customer. More specifically, some disclosed embodiments leverage mobile devices, such as cellular phones, smart phones, tablet devices, etc., that are commonly in the possession of customers to detect a customer's location. The detected customer location may be utilized by an order fulfillment process to assist in providing and/or otherwise delivering items to the customer in a timely manner.

Various embodiments are described in the context of a customer ordering items from a retail store and picking-up the ordered items from a pickup location of the retail store. However, some aspects of the disclosed embodiments may also apply to other types of businesses such as department stores, consumer malls, grocery stores, service centers, repair centers, e-commerce sites, shipping services, etc. Embodiments, for use in such contexts, are envisioned and protection for such embodiments is sought to the extent encompassed by the appended claims.

Figure 1:
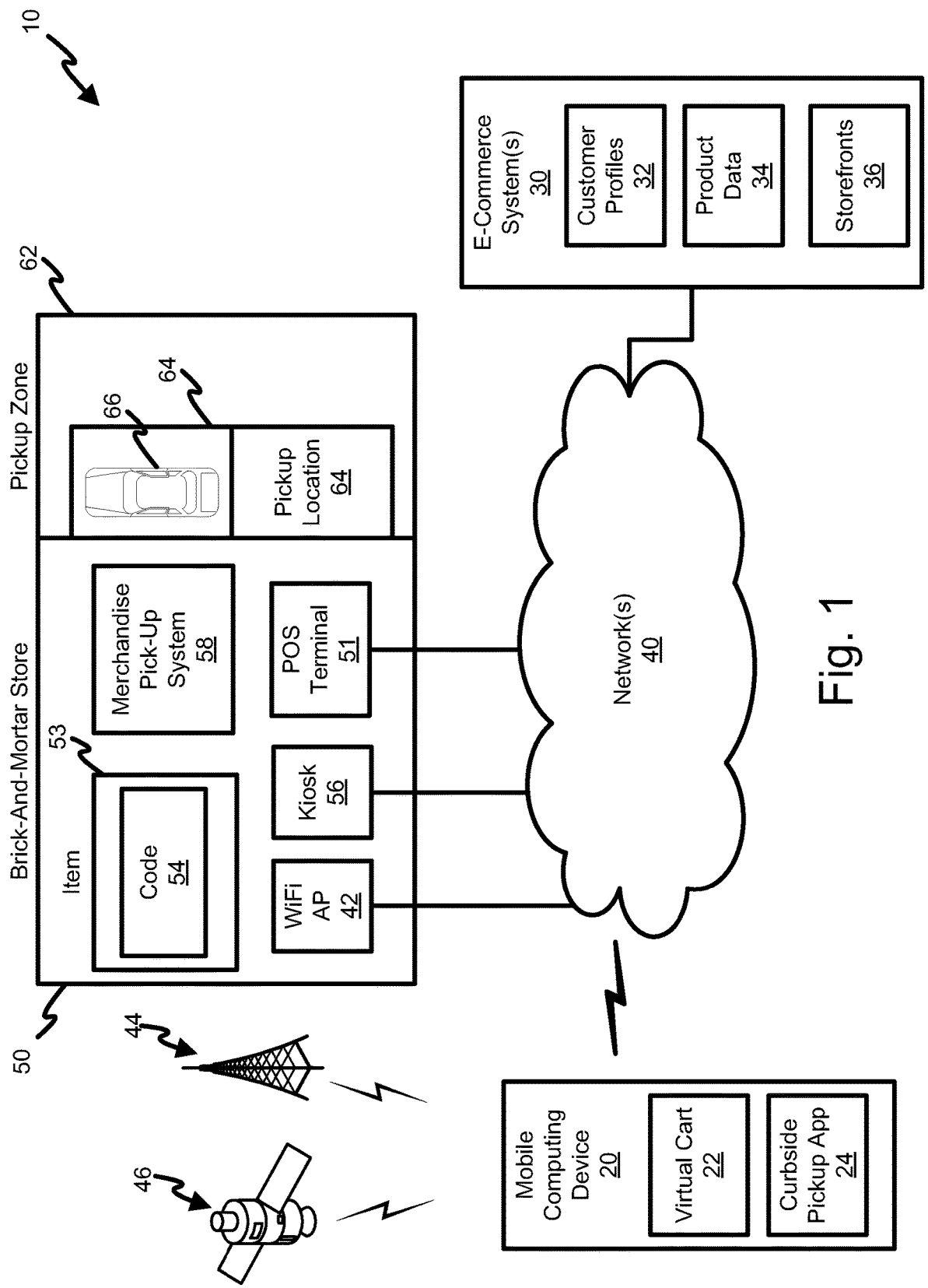
FIG. 1 shows an order fulfillment system in accordance with an example embodiment of the present invention.

Today's consumers demand convenience, speed, and selection from their retailers regardless of whether such consumers are shopping online or are shopping in a brick-and-mortar establishment. The following describes various ways a mobile computing device such as a tablet, smart phone, mobile phone, personal data assistant, hand-held gaming console, or some other form of mobile computing device may be used to support delivery of purchased items. To this end, a high level system diagram of an order fulfillment system 10 is depicted in FIG. 1. As shown, the order fulfillment system 10 may include a mobile computing device 20 connected to an e-commerce system 30 and merchandise pickup (MPU) system 58 via one or more networks 40. The networks 40 may include a number of private and/or public networks such as, for example, wireless and/or wired LAN networks, cellular networks, and the Internet that collectively provide a communication path and/or paths between the mobile computing devices 20, e-commerce system 30, and MPU system 58.

The mobile computing devices 20 may include tablets, smart phones, mobile phones, personal data assistants, hand-held gaming consoles, and/or other forms of mobile computing devices which enable a user to communicate with the e-commerce system 30 and/or MPU system 58 via the network 40. As shown, the mobile computing device 20 may further maintain a virtual shopping cart 22 in which a customer may place items for later purchase. Moreover, the mobile computing device 20 may include a curbside pickup application 24. The curbside pickup application 24 comprises instructions that, in response to being executed by the mobile computing device 20, cause the mobile computing device 20 to perform various tasks associated with the processes described in detail below with respect to FIGS. 3-5. In some example embodiments, the mobile computing device 20 may download the curbside pickup application 24 from various online application stores. Moreover, while depicted in FIG. 1 as a separate application, a larger application that provides additional functionality beyond supporting the processes of FIGS. 3-5 may include the curbside pickup application 24.

In one embodiment, the network 40 may include a number of WiFi access points (AP) or base stations 42 distributed throughout a brick-and-mortar store 50. Such WiFi base stations 42 may provide wireless network connectivity to mobile computing devices 20 used within the brick-and-mortar store 50, and thus permit such mobile computing devices 20 to wirelessly communicate with e-commerce system 30 via network 40.

The e-commerce system 30 may include one or more web servers, database servers, routers, load balancers, and/or other computing and/or networking devices. The e-commerce system 30 may maintain customer profiles 32 for various customers that utilize the shopping services provided by the order fulfillment system 10. Moreover, the e-commerce system 30 may maintain various information 34 regarding products or items 53 for sale by the brick-and-mortar store 50. Furthermore, the e-commerce system 30 may provide one or more online storefronts 36 that permit customers to purchase items 53 using a computing device. In some embodiments, one or more of the storefronts 36 are publicly accessible via a public network such as the Internet thus permitting customers to purchase items 53 from such storefronts 36 from the comfort of their homes or from other locations. In some embodiments, one or more of the storefronts 36 are not publicly accessible but limited to computing devices such as kiosk 56 within the store 50.

As shown, the brick-and-mortar store 50 may include the WiFi base stations 42, point of sale (POS) terminals 51, and the MPU system 58. The MPU system 58 may include one or more web servers, database servers, routers, load balancers, and/or other computing and/or networking devices. As explained in greater detail below with respect to the processes of FIGS. 3-5, the MPU system 58 may assist in the delivery of purchased items 53 to a customer's vehicle 66 positioned at a curbside pickup location 64 in a pickup zone 62 of the store 50.

The store 50 may further include numerous items 53, which are on display for purchase by customers of the store 50. For example, the store 53 may include shelves, clothing racks, tables, and/or other assemblies upon which items 53 may be placed in a customer accessible manner so that the customer may physically interact with the items 53. More specifically, the store 53 may display the items 53 in a manner which permits a customer to pickup the items 53 they want to purchase and place them in a shopping basket or wheeled shopping cart. The customer may then carry the items 53 to a POS terminal 51 where a store associate may scan code 54 of the selected items 53, determine a total purchase price for the selected items 53, and receive payment from the customer for the selected items 53. Besides supporting sales via POS terminals 51, the store 50 may further permit the sale of items 53 via mobile computing device 20, kiosks 56, and/or one or more online storefronts 36 provided by the e-commerce system 30.

FIG. 1 depicts the order fulfillment system 10 at a high level, the order fulfillment system 10, however, may be implemented in numerous different manners using a wide range of different computing devices, platforms, networks, etc. Moreover, aspects of the order fulfillment system 10 may be implemented using a client/server architecture, a peer-to-peer (P2P) architecture, and/or another networking architecture.

Figure 2:
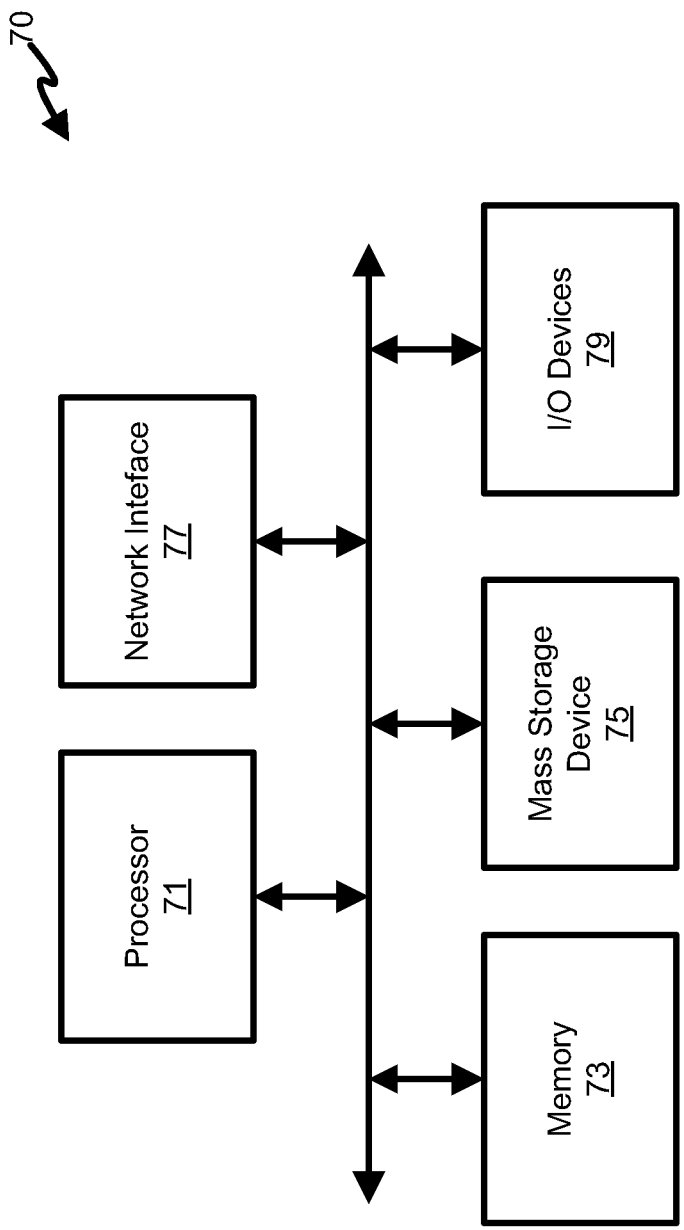
FIG. 2 shows a simplified depiction of a example computing device for use in the system of FIG. 1.

In some embodiments, the mobile computing device 20, the e-commerce system 30, POS terminals 51, kiosks 56, and/or MPU system 58 may be implemented using various types of computing devices. FIG. 2 provides a simplified depiction of a computing device 70 suitable for such aspects of order fulfillment system 10. As shown, the computing device 70 may include a processor 71, a memory 73, a mass storage device 75, a network interface 77, and various input/output (I/O) devices 79. The processor 71 may be configured to execute instructions, manipulate data and generally control operation of other components of the computing device 70 as a result of its execution. To this end, the processor 71 may include a general purpose processor such as an x86 processor or an ARM processor which are available from various vendors. However, the processor 71 may also be implemented using an application specific processor and/or other circuitry.

The memory 73 may include various types of random access memory (RAM) devices, read only memory (ROM) devices, flash memory devices, and/or other types of volatile or non-volatile memory devices. In particular, such memory devices of the memory 73 may store instructions and/or data to be executed and/or otherwise accessed by the processor 71. In some embodiments, the memory 73 may be completely and/or partially integrated with the processor 71.

In general, the mass storage device 75 may store software and/or firmware instructions which may be loaded in memory 73 and executed by processor 71. The mass storage device 75 may further store various types of data which the processor 71 may access, modify, and/otherwise manipulate in response to executing instructions from memory 73. To this end, the mass storage device 75 may comprise one or more redundant array of independent disks (RAID) devices, traditional hard disk drives (HDD), sold state device (SSD) drives, flash memory devices, read only memory (ROM) devices, and/or other types of non-volatile storage devices.

The network interface 77 may enable the computing device 70 to communicate with other computing devices via network 40. To this end, the networking interface 77 may include a wired networking interface such as an Ethernet (IEEE 802.3) interface, a wireless networking interface such as a WiFi (IEEE 802.11) interface, a radio or mobile interface such as a cellular interface (GSM, CDMA, LTE, etc) or near field communication (NFC) interface, and/or some other type of networking interface capable of providing a communications link between the computing device 70 and network 40 and/or another computing device.

Finally, the I/O devices 79 may generally provide devices which enable a user to interact with the computing device 70 by either receiving information from the computing device 70 and/or providing information to the computing device 70. For example, the I/O devices 79 may include display screens, keyboards, mice, touch screens, microphones, audio speakers, digital cameras, optical scanners, RF transceivers, etc.

While the above provides some general aspects of a computing device 70, those skilled in the art readily appreciate that there may be significant variation in actual implementations of a computing device. For example, a smart phone implementation of a computing device generally uses different components and may have a different architecture than a database server implementation of a computing device. However, despite such differences, computing devices generally include processors that execute software and/or firmware instructions in order to implement various functionality. As such, the above described aspects of the computing device 70 are not presented from a limiting standpoint but from a generally illustrative standpoint. The present application envisions that aspects of the present application may find utility across a vast array of different computing devices and the intention is not to limit the scope of the present application to a specific computing device and/or computing platform beyond any such limits that may be found in the appended claims.

In some embodiments, the mobile computing device 20 may include one or more I/O devices 79 suitable for identifying an item 53 which the customer wishes to purchase. For example, the mobile computing device 20 may include a digital image sensor (e.g., a digital camera), an optical scanner, an RF transceiver, a near field communication (NFC) transceiver, and/or some other device suitable for reading, scanning, and/or imaging codes 54 associated with items 53. In such embodiments, the customer may select items 53 and place them in their virtual cart 22 by reading, scanning, imaging, etc. various codes 54 associated with the items 53. In particular, the mobile computing device 20 may support reading, scanning, and/or imaging a large variety of codes such as bar codes, Universal Product Codes (UPC) codes, Quick Response (QR) codes, Augmented Reality (AR) codes, radio-frequency identification (RFID) tags, near field communication (NFC) codes. Moreover, such codes 54 may be attached to the item 53, to tags or labels that are attached to the item 53, and/or tags or labels that are otherwise associated with the item 53. For example, such codes 54 may be placed upon display signs for the item 53, shelf tags for the item 53, or at some other locale associated with the item 54 so that the customer may readily scan, read, or image such codes 54 with the mobile computing device 20.

Besides using the mobile computing device 20 to select items 53 and place such items in a virtual cart 22, the customer may also use the mobile computing device 20 to purchase the items in their virtual cart 22. For example, the customer may enter credit card and/or other payment information via the mobile computing device 20. The mobile computing device 20 may transmit such information to the e-commerce system 30 which may verify payment information and provide the mobile computing device 20 with one or more proofs of purchase (e.g., a digital receipt, bar codes, etc.) for the items 53 in the virtual cart 22.

In some embodiments, the customer may choose a manner of fulfillment for each item in their virtual cart 22. In particular, the customer in one embodiment may choose whether a particular item 53 is to be provided to the customer via curbside pickup or shipped to the customer's address. In particular, the mobile computing device 20 may request the customer to choose a fulfillment option for each item 53 as its placed in their virtual cart 22 (e.g., as the customer scans the bar code associated with each item). Since such constant queries may become tedious to the customer, the mobile computing device 20 may assume a default fulfillment option (e.g., curbside pickup) for each item 53 unless the customer indicates a different option for the item 53. The mobile computing device 20 may further permit the customer to choose the default fulfillment option and/or permit the customer to set a fulfillment option for the complete order. In some embodiments, the mobile computing device 20 may permit the customer to review and revise the fulfillment option for each item 53 in the virtual cart 22 as part of the checkout process.

In some embodiments, the I/O devices 79 of the mobile computing device 20 may include a geographic positioning system (GPS) receiver to permit the mobile computing device 20 to determine its global position. In particular, the GPS receiver may be configured to receive signals from GPS satellites 46 and ascertain the geographic position of the GPS receiver based on such received GPS satellite signals. In other embodiments, the I/O devices 79 of the mobile computing device 20 may not include a GPS receiver, but the mobile computing device 20 may be able to determine its position nonetheless. For example, as noted above, the network interface 77 may include a cellular interface (GSM, CDMA, LTE, etc). Such a cellular interface may permit the mobile computing device 20 to receive signals from various cell towers 44. Based on known positions of the cell towers 44 and the signals received from such towers 44, the mobile computing device 20 may be able to discern its position (e.g., using triangulation).

As mentioned above, the order fulfillment system 10 may support or provide various features that attempt to enhance and/or otherwise improve a customer's shopping experience. To this end, the order fulfillment system 10 may provide curbside pickup for purchased items. In particular, the order fulfillment system 10 may support curbside pickup for items purchased in a brick-and-mortar store 50 and/or items purchased via an on-line storefront associated with the brick-and-mortar store 50. As explained below, the order fulfillment system 10 may cause items to be delivered to a customer's vehicle 66 without the customer entering the store 50.

Figure 3:
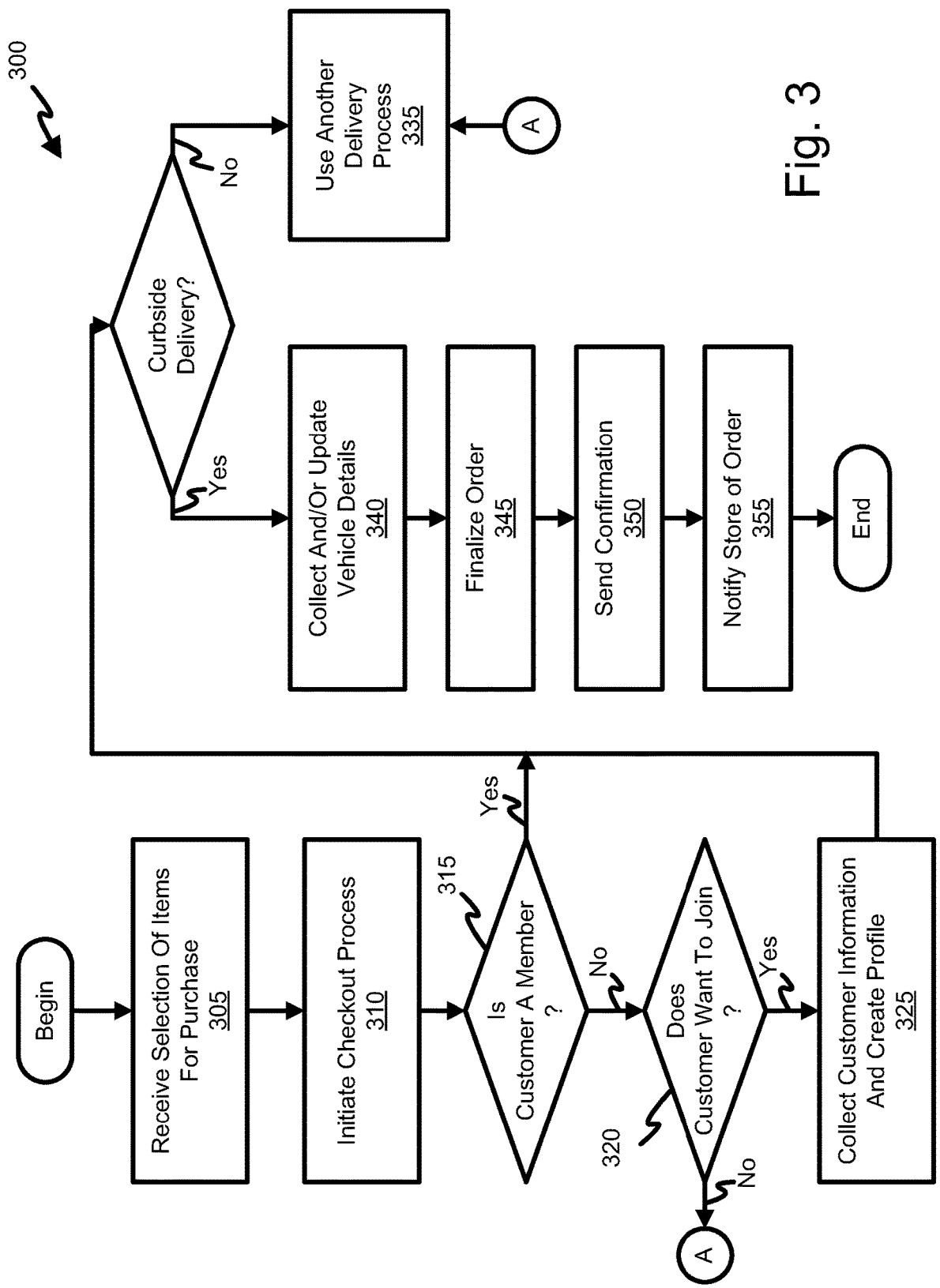
FIG. 3 shows a process implemented by an example embodiment of the e-commerce system of FIG. 1

FIG. 3 shows a process 300 that may be implemented by an example embodiment of the e-commerce system 30. Per the process 300, the e-commerce system 30 may permit a customer to purchase items 53 for curbside pickup at a selected store 50. To this end, the e-commerce system 30 at 305 may receive a customer's selection of one or more items 53 for purchase. In particular, a customer may use a computing device 70 to interact with a storefront 36 of the e-commerce system 30 and place items 53 in a virtual shopping cart 22 maintained by the computing device 70 and/or the e-commerce system 50. The computing device 70 may be external to the store 50 such as a mobile phone, a tablet, a laptop, a desktop, or another computing device capable of communicating with a storefront 36 that is accessible via a public network such as the Internet. The computing device 70 used by the customer may alternatively be in the store 50 such as a mobile computing device 20 carried by the customer, a POS terminal 51, and/or kiosk 56. In such a situation, the in-store computing device 70 may access a publicly-accessible storefront 36 of the e-commerce system 30 that is also accessible from locations external to the store 50 and/or may access a private storefront 36 of the e-commerce system 30 that is accessible only to computing devices 70 in or in close proximity to the store 50.

After the customer selects items 53 for purchase, the e-commerce system 30 at 310 may initiate a checkout process in response to receiving an indication from the customer via a computing device 70 that the customer is ready to purchase the selected items 53 and finalize the purchase. During the checkout process, the e-commerce system 30 may confirm payment of the items 53 as well as confirm other information for delivering the purchased items 53 to the customer.

At block 315, the e-commerce system 30 may determine whether the customer is a member. As depicted, the e-commerce system 30 may make such determination after initiating the checkout process. In other embodiments, a member may manually and/or automatically login upon visiting the storefront 36. The e-commerce system 30, in such embodiments, may determine whether the customer is a registered member of the storefront 36 prior to initiating the checkout process.

If the e-commerce system 30 at 315 determines the that the customer is not a registered member, then the e-commerce system 30 at 320 may ask the customer via the computing device 70 whether the customer would like to become a registered member. If the e-commerce system 30 receives a response indicating that the customer does not wish to become a member, then the e-commerce system 30 may proceed with an anonymous and/or guest checkout process at 335 which permits the customer to finalize the purchase without joining the storefront 36 or becoming a registered member.

Otherwise, the e-commerce system 30 may collect information from the customer via the computing device 70 and create a customer profile 32 based on the collected information. For example, the e-commerce system 30 may collect name, shipping address, billing address, payment information, email address, user name, password, and/or other information from which to establish the customer profile 32.

After determining the customer is a member at 315 or creating a profile 32 for the newly joined member at 325, the e-commerce system 30 at 330 may ask whether the purchased items 53 are to be delivered via curbside pickup. Such an inquiry may be part of a checkout process in which the customer selects a form of delivery for the entire order and/or individually selects a form of delivery for each purchased item 53. Moreover, in one embodiment, curbside pickup is a service offered only to members and thus not presented to customers that elect to forgo membership. However, in other embodiments, the e-commerce system 30 may offer curbside pickup to customers that are not registered members.

If the customer does not select curbside pickup for any of the purchased items 53, the e-commerce system 30 at 335 may proceed with finalizing the order using other delivering processes such as shipment to a shipping address of the customer profile 32. Otherwise, the e-commerce system 30 at 340 collects information from the customer regarding the vehicle 66 which will be used during the curbside pickup. For example, the e-commerce system 30 via a computing device 70 may present the customer with a form that permits the customer to select a year, make, model, and color of the vehicle 66 to be used during the curbside pickup. The form may further provide an option that permits the customer to save the vehicle information to the customer's profile 32. By saving vehicle information to the customer profile 32, the e-commerce system 30 during future purchases may present a form which permits the customer to select previously saved vehicle information and which permits the customer to add further vehicle information to the customer profile 32.

The e-commerce system 30 may then finalize the order at 345. For example, the e-commerce system 30 may verify that the store 50 from which the customer wishes to pickup the purchased items 53, verify availability of all purchased items 53 from the selected store 50, verify and/or execute payment for the purchased items 53, verify billing address of the customer, verify shipping address for any items to be shipped, etc. The e-commerce system 30 may provide the customer with instructions for picking-up the purchased items 53 from the selected store 50 as well as hyperlinks and/or other mechanisms for obtaining a copy a curbside pickup application 24 for aiding the customer and store 50 with the curbside pickup process. For example, in one embodiment, the e-commerce system 30 may inform the customer via computing device 70 that the purchased items 53 should be ready for pickup in less than 2 hours, but that the customer should wait for an email notifying the customer that the purchased items 53 are available for pickup before traveling to the store 50.

At 350, the e-commerce system 30 may provide the customer with one or more order confirmations. For example, the e-commerce system 30 may cause a web browser of the computing device 70 to display a receipt for the purchased items and provide a link or other mechanism via which the customer may download and/or print the receipt. The e-commerce system 30 may further email a receipt or an order confirmation to the customer using an email address supplied during the checkout process or pulled from the customer profile 32.

At 355, the e-commerce system 30 may notify the MPU system 58 for the selected store 50 of the purchased items 53. Such notice permits one or more MPU associates of the store 50 to gather the purchased items 53 prior to the customer arriving at the store 50. Moreover, as explained in more detail below, the store 50 may notify the customer when the order is ready for pickup so that the customer may pickup the purchased items 53 without a lengthy wait at the store 50.

Figure 4:
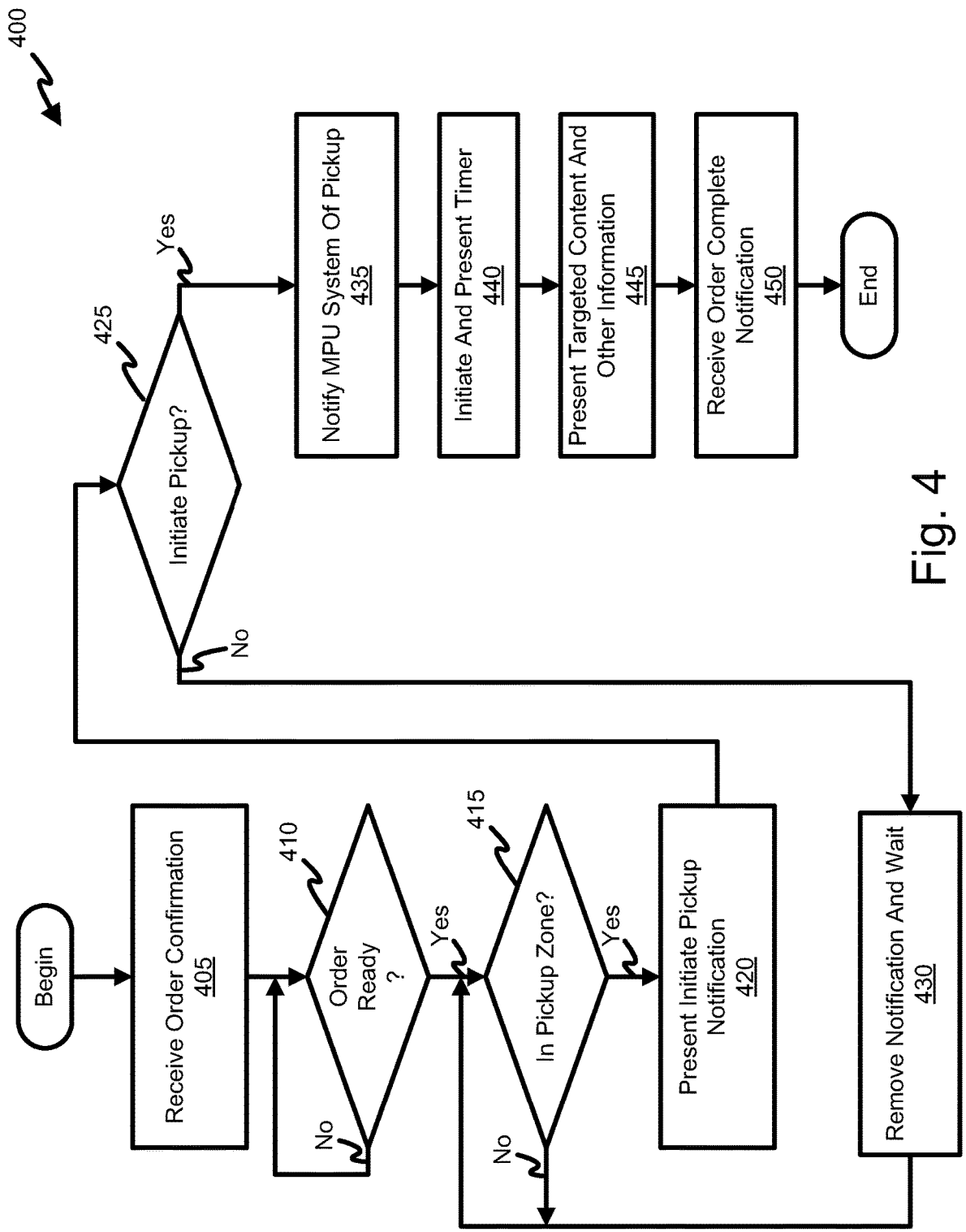
FIG. 4 shows a process implemented by an example embodiment of the mobile computing device of FIG. 1.

Referring now to FIG. 4, a process 400 that may be implemented by mobile computing device 20 and/or the curbside pickup application 24 is shown. In the interest of clarity, the following process 400 is described from the standpoint of the curbside pickup application 24 performing various actions. The curbside pickup application 24 does not in fact perform such actions, but instead provides instructions which configure and/or otherwise cause the mobile computing device 20 to perform the respective actions due to execution of such instructions of the curbside pickup application 24. Stating that software and/or firmware modules, such as the curbside pickup application 24, perform various actions is merely a manner of convenience that is in common usage in the industry.

At 405, the mobile computing device 20 and/or the curbside pickup application 24 may receive a message or other notification confirming the purchase of items 53. As noted above, the e-commerce system 30 at 350 may provide the customer with an order confirmation by, for example, sending an email using an email address associated with the customer. The mobile computing device 20 and/or the curbside pickup application 24 at 405 may receive such order confirmation from the e-commerce system 30. In some embodiments, the notification may inform the curbside pickup application 24 that an order ready notification is expected in the near future. As such, the curbside pickup application 24 may alter its operation and/or the operation of the mobile computing device 20 in anticipation of the to-be-received notification that indicates the order is ready for pickup. For example, the curbside pickup application 24 may adjust the frequency at which email is checked, adjust power management features, and/or adjust other operating characteristics associated with receiving the notification.

At 410, the curbside pickup application 24 may determine whether a notification that the purchased items 53 are ready for curbside pickup has been received. In some embodiments, the MPU system 58 of the selected store 50 may send a notification to the curbside pickup application 24. For example, the MPU system 58 may use an address associated with the customer to send or otherwise provide an email message (e.g. Simple Mail Transfer Protocol (SMTP) message), a text message (e.g., a Short Message Service (SMS) message), a push notification (e.g., Apple Push Notification Message), an instant message (e.g., Extensible Messaging and Presence Protocol (XMPP) message), or some other form of message that the purchased items 53 of their order are ready for curbside pickup at the selected store 50.

If the notification has yet to be received, the curbside pickup application 24 continues to wait for the notification at 410. Otherwise, the curbside pickup application 24 proceeds to 415 to determine whether the customer's mobile computing device 20 and therefore the customer are within a specified vicinity or within a pickup zone 62 of the store 50. In particular, the curbside pickup application 24 and/or the MPU system 58 may define the pickup zone 62 using various techniques. For example, the curbside pickup application 24 may determine that the mobile computing device 20 is within the pickup zone 62 in response to detecting a short range signal from the MPU system 58 or detecting such a short range signal is above a threshold level. In other embodiments, the curbside pickup application 24 uses global positioning capabilities of the mobile computing device 20 to determine the global position of the mobile computing device 20. The curbside pickup application 24 may then compare the determined global position to a specified pickup zone 62 for the store 50 to determine whether the mobile computing device 20 is within the pickup zone 62 of the store 50.

If the curbside pickup application 24 determines that the mobile computing device 20 is not within the pickup zone 62 for the store 50, then the curbside pickup application 24 may continue to monitor the location of the mobile computing device 20 with respect to the pickup zone 62 at 415. Otherwise, the curbside pickup application 24 at 420 generates a notification that requests whether the customer wants to initiate the curbside pickup process. The customer may be in the vicinity of the store 50 for reasons other than picking-up the purchased items 53. By requesting the customer whether to initiate the process, the customer does not feel obligated to pickup the items 53 when not otherwise prepared. Moreover, MPU associates of the store 50 do not waste time trying to deliver items 53 to customer's which were falsely identified as being in the pickup zone 62 or who otherwise have no intention of picking-up the items 53 at the present time. As such, the notification presented at 420 may be beneficial to both the customer and the store 50.

If the customer at 425 declines to initiate the curbside pickup process or ignores the notification at 420, the curbside pickup application 24 at 430 may remove the presented notification and wait before returning to 415. In one embodiment, the curbside pickup application 24 may wait a predetermined or customer specified time before returning to 415. By waiting, the curbside pickup application 24 may prevent the continual presentation of the notification at 420 while the mobile computing device 20 is in the pickup zone 62 but the customer does not wish to initiate the curbside pickup. In another embodiment, the curbside pickup application 24 may wait until it determines that the mobile computing device 20 has left the pickup zone 62 before returning to 415. In this manner, the curbside pickup application 24 may present the notification 420 a single time each time the customer enters the pickup zone 62. Other schemes of intelligently presenting the notification at 420 without nagging the customer with continual notifications are possible.

If the customer at 425 elects to initiate the curbside pickup process, the curbside pickup application 24 at 430 may send a notification to the MPU system 58 that informs the MPU system 58 that the customer intends to pickup the purchased items 53 and that a MPU associate should gather the items 53 and be prepared to deliver such items 53 to the customer. The curbside pickup application 24 may use an address associated with the MPU system 58 of the selected store 50 to send or otherwise provide an email message, a text message, a push notification, an instant message, or some other form of notification that informs the MPU system 58 that the customer wishes to initiate curbside pickup.

The curbside pickup application 24 at 440 may initiate and present the customer with a timer in response to initiating the curbside pickup process at 425. In one embodiment, the curbside pickup application 24 presents a timer which counts up and therefore represents the passage of time since initiating the curbside pickup process at 425. In another embodiment, the curbside pickup application 24 presents a timer which counts down from a guaranteed or targeted deliver time. In such an embodiment, the store 25 may have a policy of delivering the purchased items 53 to the customer's vehicle 66 within a specified period of time (e.g. 5 minutes) from initiating the curbside pickup process at 425. The timer in such an embodiment therefore depicts the time remaining for delivery. In some embodiments, the store 50 may provide the customer with some form of compensation if the MPU associate is unable to deliver the purchased items 53 in the allotted time. For example, the store 50 may provide the customer with a coupon, store credit, a refund, partial refund, and/or some other form of compensation in an attempt to incentives customers to use their services.

The curbside pickup application 24 at 445 may further provide the customer with content targeted at the customer, additional pickup instructions, and/or other information received from the MPU system 58 while the customer awaits delivery of the purchased items 53 to their vehicle 66. In some embodiments, the targeted content may include coupons, discounts, incentives to purchase items, videos, clips, audio, video, and/or textual messages, offers, sweepstake and/or other contest opportunities, social engagement options such as posting aspects of the order to social networking environments (e.g., community maintained by store 50, Twitter, Facebook, etc.). Moreover, the MPU system 58 may customize the targeted content based on the customers profile 32, purchased items 53 of the present order, and/or previously purchased items 53.

After receiving the items 58 and finalizing the purchase, the curbside pickup application 24 at 450 may receive and present a notification from the MPU system 58 confirming completion of the order. Such notification may include additional information regarding the order such as reward points earned as a result of the purchased items 53 as well as applicable warranty information, rebates, and/or offers for related items 53.

Figure 5:
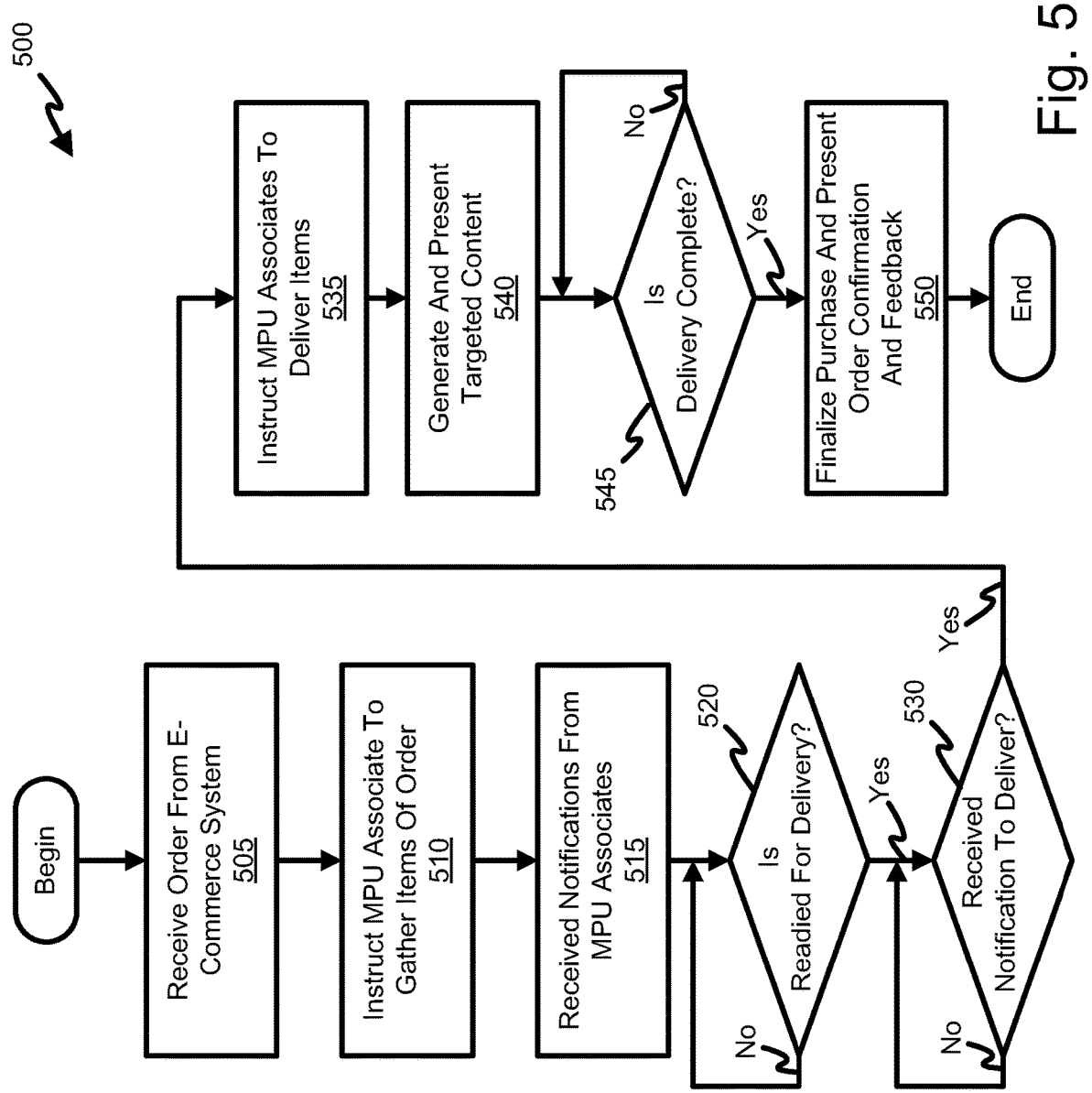
FIG. 5 shows a process implemented by an example embodiment of the merchandise pickup system of FIG. 1.

Referring now to FIG. 5, a process 500 that may be implemented by the MPU system 58 is shown. As noted above with respect to FIG. 3, the e-commerce system 30 at 355 may notify the store 50 of the items 53 purchased by the customer. At 505, the MPU system 58 may receive such notification from the e-commerce system 30. In response to such notification, the MPU system 58 at 510 may instruct one or more MPU associates to ready the purchased items 53 for curbside pickup. In one embodiment, each MPU associate has a computing device 70 such as a tablet, smartphone, or other portable computing device. The MPU system 58 may therefore instruct one or more MPU associates via their respective computing devices 70 to gather the purchased items 53 and ready them for curbside deliver. In particular, the MPU associates may gather the purchased items 53 and place the gathered items 53 in designated areas, lockers, bins, etc. located near a curbside pickup location 64 of the store 50. Such gathering and storing in designated areas, lockers, bins, etc. may enable quick retrieval of the items 53 once the customer's vehicle 66 arrives at the curbside pickup location 64.

At 515, the MPU system 58 may receive notifications from the MPU associates via their respective computing devices 70 that the items 58 for the order have been gathered and readied for curbside deliver. The MPU system 58 at 520 may determine, based on notifications received from the MPU associates, whether all items 58 of the order are ready for curbside pickup. If one or more items 53 are not yet ready, the MPU system 58 may return to 515 to receive additional notifications from the MPU associates. Otherwise, the MPU system 58 may notify the customer that the items 53 of their order are ready for curbside pickup. As explained above with respect to 410 of FIG. 4, the MPU system 58 may use an address associated with the customer to send or otherwise provide an email message, a text message, a push notification, an instant message, or some other form of notification that informs the curbside pickup application 24 of the customer's mobile computing device 20 that the purchased items 53 of their order are ready for curbside pickup at the selected store 50.

As noted above with respect to 430 of FIG. 3, the curbside pickup application 24 may send or otherwise provide the MPU system 58 with an email message, a text message, a push notification, an instant message, or some other form of notification that informs the MPU system 58 that the customer wishes to initiate curbside pickup. Accordingly, the MPU system at 530 may determine whether a notification to initiate curbside pickup for a readied order has been received from a curbside pickup application 24. If the MPU system 58 determines that such a notification has not been received, then the MPU system 58 may wait at 530 until such a notification is received.

In response to determining that such a notification has been received, the MPU system 58 at 535 may notify one or more MPU associates via respective computing devices 70 to deliver the items 53 to the customer. In one embodiment, the MPU system 58 may provide such notification via an email message, a text message, a push notification, an instant message, or some other form of notification that instructs the MPU associate to deliver the items 58 to the customer's vehicle 66 at a curbside pickup location 64. In particular, such notification may identify the items 58 to be delivered, a location (e.g., designated area, locker, bins, etc.) from which the items 58 may be retrieved, a curbside pickup location 64 to which the items 58 are to be delivered, as well as a description of the customer's vehicle 66 to which the items 58 are to be delivered.

While the MPU associates deliver the items 58 to the curbside pickup location 64, the MPU system 58 at 540 may provide targeted content to the customer via the curbside pickup application 24 As noted above with respect to 445, the targeted information may include coupons, discounts, incentives to purchase items, videos, clips, audio, video, and/or textual messages, offers, sweepstake and/or other contest opportunities, social engagement options such as posting aspects of the order to social networking environments (e.g., community maintained by store 50, Twitter, Facebook, etc.). Moreover, the MPU system 58 may customize the targeted content based on the customers profile 32, purchased items 53 of the present order, and/or previously purchased items 53.

At 545, the MPU system 58 may determine whether the items 58 have been delivered to the curbside location 64. In one embodiment, the MPU associates verify the identity of the customer prior to handing the items 58 over to the customer and/or loading the items 58 in the customer's vehicle 66. To this end, the MPU associates confirm that the vehicle 66 matches the description of the vehicle provided by the MPU system 58 via their computing devices 70. Moreover, the MPU associates swipe the credit card or debit card used by the customer to purchase the items 58. The computing device 70 may verify whether the swiped card matches the card used to purchase the items 58. The MPU associates may further require that the customer provide a picture identification card such as a driver's license and verify that the name on the identification card matches the name on the ordered items and that the picture on the identification card matches the customer. In response to this verification process, the MPU system 58 may receive one or more confirmations and/or other messages from the MPU associates and determine at 545 whether delivery of the items 58 to the curbside pickup location 64 has been completed.

In response to determining that delivery has been completed, the MPU system 58 at 550 may finalize the purchase and notify the customer that the purchase is complete. In particular, the MPU system 58 may finally submit the customer's credit card information to a card processing service for reimbursement. Moreover, the MPU system 58 may send the curbside pickup application 24 of the customer a notification confirming completion of the order. Such notification may include additional information regarding the order such as reward points earned as a result of the purchased items 53 as well as applicable warranty information, rebates, and/or offers for related items 53.

The processes of FIGS. 3-5 were described above with respect to a customer picking-up items at a curbside location 64. Aspects of such process, however, may be generally applicable to picking-up items from a store. In particular, aspects of the above process may be suitable for use in a system where items are not picked-up from a curbside location external to the store 50 but instead are pickup from a pickup location, customer service counter, or other location within the store 50.

The processes of FIGS. 3-5 were mainly described from the perspective of completely delivering items 53 to a customer at a curbside location 64. Despite a customer requesting pickup and having a vehicle 66 at the pickup location 64, situations may still arise where delivering items 53 is not feasible. For example, one or more items 53 may not fit in the customer's vehicle 66 due to the customer underestimating the size of a large item 53 (e.g., a 70" television) or the overall size of the ordered items 53. The customer may, therefore, need to return with a larger vehicle 66 or pickup the items 53 across multiple trips. In such situations, the curbside pickup application 24 and/or a computing device 60 of a MPU associate may permit a partial delivery and mark remaining items 53 for another pickup.

In some embodiments, the customer may purchase one or more items 53 that are not currently in stock at the store 50. As the items arrive at the store 50, the MPU system 58 may inform the curbside pickup application 24 of the arrived items 53. The customer may then elect to curbside pickup the available items 53 in a manner similar to the processes depicted in FIGS. 3-5 or elect to wait until all items have arrived. Regardless, the MPU system 58 may reserve such items 53 until at least all items of the order have arrived. In this manner, the customer may accept partial delivery of certain items 53 via curbside pickup without necessarily awaiting the arrival of all items.

The above curbside pickup process provides much flexibility to customer and the store 50. In particular, the processes of FIGS. 3-5 do not require the customer to schedule a particular time for picking-up the items 53. As such, the customer may pickup the items 53 when convenient to the customer. Moreover, such moment of convenience may have been unplanned or unforeseeable at the time of placing the order since it's not uncommon for a customer's plans to change without notice. At the same time, the store 50 does not need to schedule pickup times, reschedule missed pickups, or otherwise waste employee time waiting for customers that are either late for a pickup or miss their allotted pickup time all together.

Various embodiments of the invention have been described herein by way of example and not by way of limitation in the accompanying figures. For clarity of illustration, exemplary elements illustrated in the figures may not necessarily be drawn to scale. In this regard, for example, the dimensions of some of the elements may be exaggerated relative to other elements to provide clarity. Furthermore, where considered appropriate, reference labels have been repeated among the figures to indicate corresponding or analogous elements.

Moreover, certain embodiments may be implemented as a plurality of instructions on a tangible, computer readable storage medium such as, for example, flash memory devices, hard disk devices, compact disc media, DVD media, EEPROMs, etc. Such instructions, when executed by one or more computing devices, may result in the one or more computing devices performing various aspects of the processes depicted in FIGS. 3-5.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment or embodiments disclosed, but that the present invention encompasses all embodiments falling within the scope of the appended claims.

What is claimed is:

1. A method, the method comprising:
 via a mobile computing device:
  after receiving an order confirmation for an item, increasing a frequency of checking for an indication that the item is ready for pickup;
  receiving the indication that the item is ready for pickup;
  determining a current location of the mobile computing device via a satellite-based location determining system, wherein the mobile computing device comprises a GPS receiver;
  determining that the current location of the mobile computing device corresponds to a predefined pickup zone for the item;
  inquiring whether a user of the mobile computing device desires to initiate a pickup of the item; and
  one of initiating the pickup of the item or declining the pickup of the item, wherein the pickup is automatically declined if the user fails to respond to the inquiry after spending a preset amount of time in the predefined pickup zone.

2. The method of claim 1, comprising:
 initiating a timer that reflects an elapse of time since entering the predefined pickup zone; and
 presenting the timer via the mobile computing device.

3. The method of claim 1, comprising:
 receiving content targeted to a customer associated with the item for pickup in response to initiating the pickup; and
 presenting the targeted content via the mobile computing device.

4. The method of claim 1, comprising:
 receiving pickup instructions in response to requesting pickup; and
 presenting the instructions via the mobile computing device.

5. The method of claim 1, comprising:
 receiving an order confirmation for the item; and
 altering one or more power management features of the mobile computing device in response to receiving the order confirmation.

6. The method of claim 1, wherein the determining whether the current location of the mobile computing device corresponds to the predefined pickup zone, comprises:
 monitoring, with the mobile computing device, a global location of the mobile computing device; and
 comparing, with the mobile computing device, the global location of the mobile computing device to the predefined pickup zone.

7. The method of claim 1, wherein the determining whether the current location of the mobile computing device corresponds to the predefined pickup zone, comprises:
 receiving, by the mobile computing device, a short range signal transmitted from the store, wherein the short range signal is communicated according to one of an NFC protocol, a Bluetooth protocol and a WiFi protocol; and
 determining, by the mobile computing device, the current location of the mobile computing device corresponds to the predefined pickup zone based on receipt of the short range signal from the store.

8. A computer readable storage device comprising a plurality of instructions, that in response to being executed, cause a mobile computing device to:
 receive an order confirmation for an item;
 after receiving an order confirmation for an item, increase a frequency of checking for an indication that the item is ready for pickup;
 receive the indication that the item is ready for pickup;
 determine a current location of the mobile computing device via a satellite-based location determining system, wherein the mobile computing device comprises a GPS receiver;
 determine that the current location of the mobile computing device corresponds to a predefined pickup zone for the item;
 inquire whether a user of the mobile computing device desires to initiate a pickup of the item; and
 one of initiate the pickup of the item or decline the pickup of the item, wherein the pickup is automatically declined if the user fails to respond to the inquiry after spending a preset amount of time in the predefined pickup zone.

9. The computer readable storage device of claim 8, wherein the plurality of instructions cause the mobile computing device to:
   initiate a timer that reflects an elapse of time since entering the predefined pickup zone; and
   present the timer.

10. The computer readable storage device of claim 8, wherein the plurality of instructions cause the mobile computing device to:
    receive content targeted to a customer associated with the item for pickup in response to initiating the pickup; and
    present the targeted content.

11. The computer readable storage device of claim 8, wherein the plurality of instructions cause the mobile computing device to:
    receive pickup instructions in response to requesting pickup; and
    present the instructions.

12. The computer readable storage device of claim 8, wherein the plurality of instructions cause the mobile computing device to:
    receive an order confirmation for the item; and
    alter one or more power management features of the mobile computing device in response to receiving the order confirmation.

13. The computer readable storage device of claim 8, wherein the plurality of instructions cause the mobile computing device to:
    monitor a global location of the mobile computing device; and
    compare the global location of the mobile computing device to the predefined pickup zone.

14. The computer readable storage device of claim 8, wherein the plurality of instructions cause the mobile computing device to:
    receive a short range signal transmitted from the store, wherein the short range signal is communicated according to one of an NFC protocol, a Bluetooth protocol and a WiFi protocol; and
    determine the current location of the mobile computing device corresponds to the predefined pickup zone based on receipt of the short range signal from the store.

15. A system, comprising:
    an application stored on a physical memory of a mobile computing device, wherein the application is executed by a processor that configures the mobile computing device to:
    receive an order confirmation for an item;
    after receiving an order confirmation for an item, increase a frequency of checking for an indication that the item is ready for pickup;
    receive the indication that the item is ready for pickup;
    determine a current location of the mobile computing device via a satellite-based location determining system, wherein the mobile computing device comprises a GPS receiver;
    determine that the current location of the mobile computing device corresponds to a predefined pickup zone for the item;
    inquire whether a user of the mobile computing device desires to initiate a pickup of the item; and
    one of initiate the pickup of the item or decline the pickup of the item, wherein the pickup is automatically declined if the user fails to respond to the inquiry after spending a preset amount of time in the predefined pickup zone.

16. The system of claim 15, wherein the processor configures the mobile computing device to:
    initiate a timer that reflects an elapse of time since entering the predefined pickup zone; and
    present the timer.

17. The system of claim 15, wherein the processor configures the mobile computing device to:
    receive content targeted to a customer associated with the item for pickup in response to initiating the pickup; and
    present the targeted content.

18. The system of claim 15, wherein the processor configures the mobile computing device to:
    receive pickup instructions in response to requesting pickup; and
    present the instructions.

19. The system of claim 15, wherein the processor configures the mobile computing device to:
    receive an order confirmation for the item; and
    alter one or more power management features of the mobile computing device in response to receiving the order confirmation.

20. The system of claim 15, wherein the processor configures the mobile computing device to:
    monitor a global location of the mobile computing device; and
    compare the global location of the mobile computing device to the predefined pickup zone.

21. The system of claim 15, wherein the processor configures the mobile computing device to:
    receive a short range signal transmitted from the store, wherein the short range signal is communicated according to one of an NFC protocol, a Bluetooth protocol and a WiFi protocol; and
    determine the current location of the mobile computing device corresponds to the predefined pickup zone based on receipt of the short range signal from the store.

* * * * *